April 29, 1958      J. A. SPITZ      2,832,392
WIRE INSERT FOR TIRES
Filed April 22, 1954      2 Sheets-Sheet 1
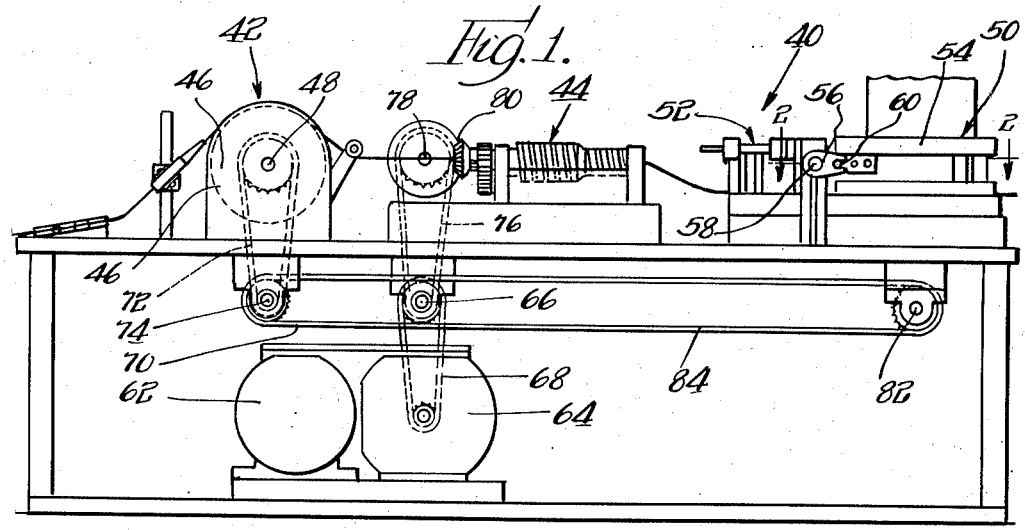
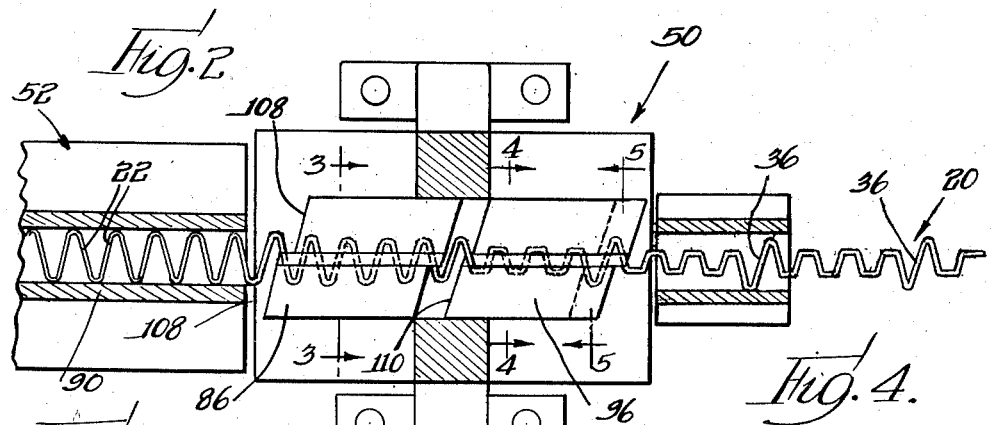
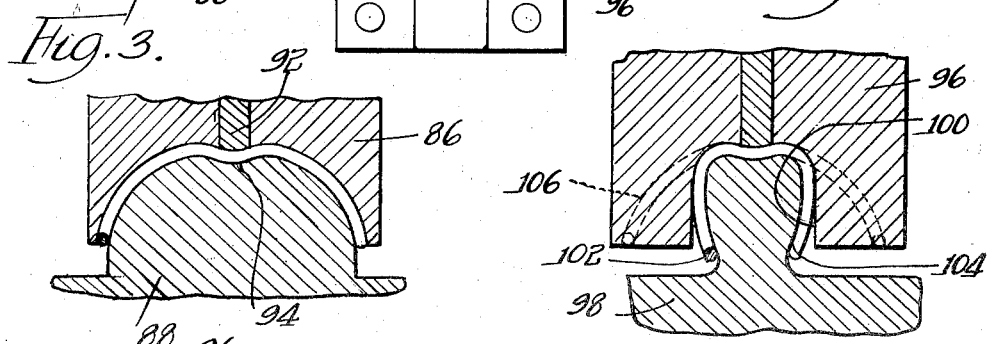
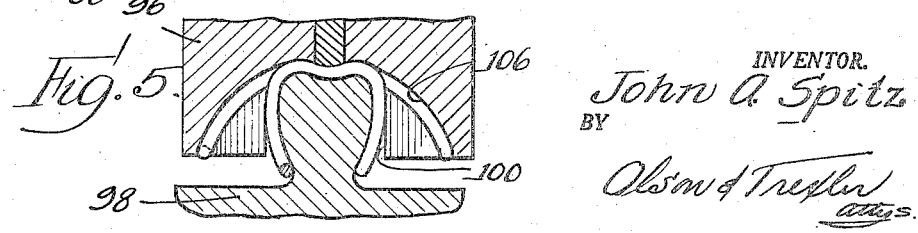
INVENTOR.
John A. Spitz
BY
Olson & Trexler
attys.

April 29, 1958     J. A. SPITZ     2,832,392
WIRE INSERT FOR TIRES
Filed April 22, 1954     2 Sheets-Sheet 2
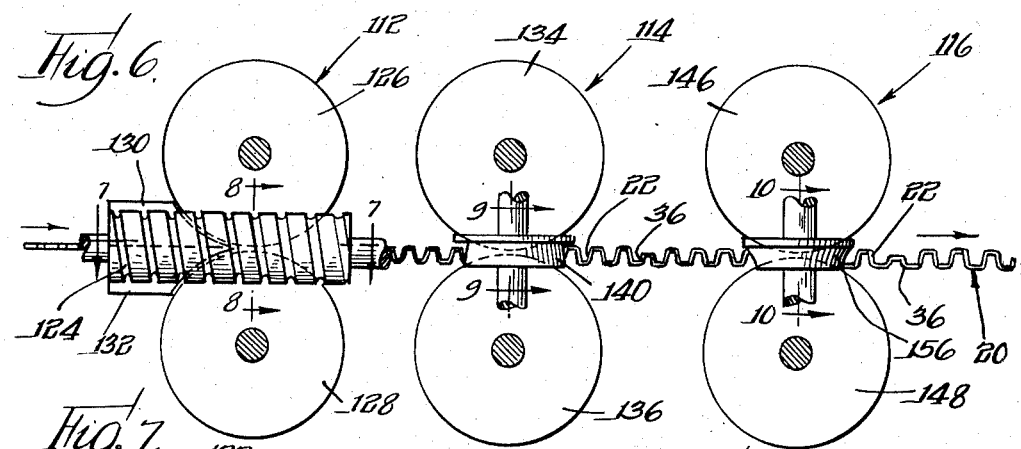
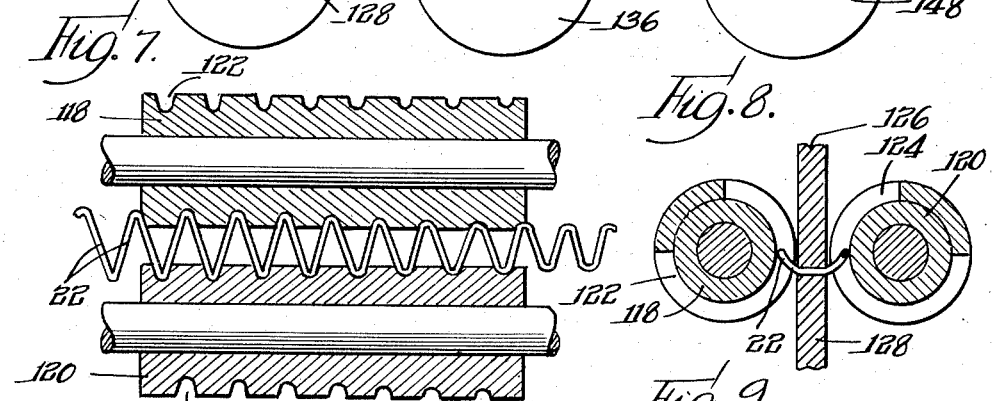
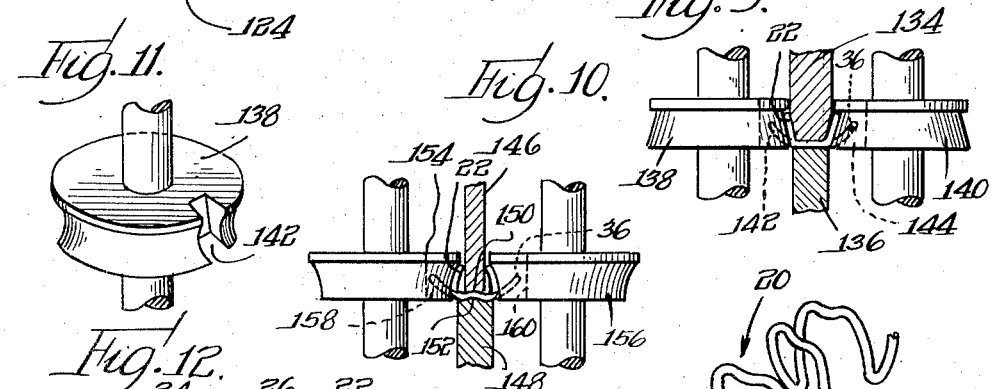
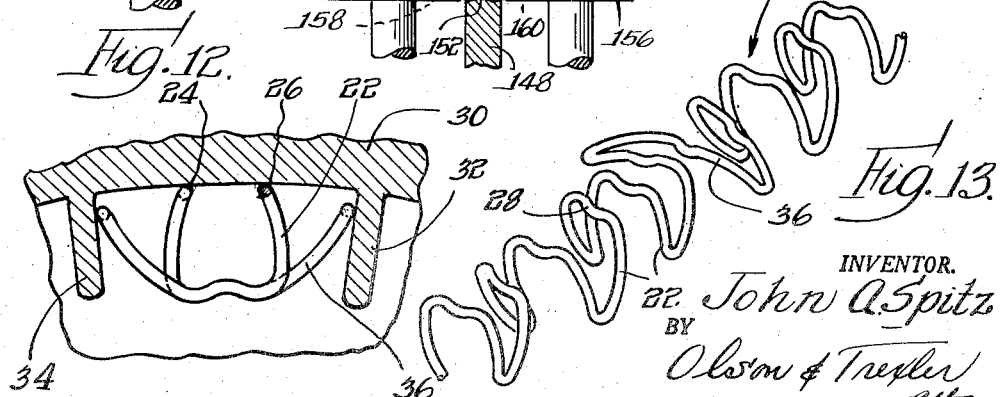
INVENTOR.
John A. Spitz
BY
Olson & Trexler
Attys.

United States Patent Office 2,832,392
Patented Apr. 29, 1958

2,832,392

WIRE INSERT FOR TIRES

John A. Spitz, Rockford, Ill., assignor to Odin Corporation, Rockford, Ill., a corporation of Illinois Application April 22, 1954, Serial No. 425,001

1 Claim. (Cl. 152—211)

The present invention relates to a novel wire insert for tires. Wire inserts for automobile tires have heretofore been proposed and while it is known that such inserts serve to dissipate heat and thereby prolong the useful life of a tire and also serve to increase the gripping power of a tire, they have not been generally adopted by new tire manufacturers. One of the primary reasons why such inserts have not been generally adopted by new tire manufacturers is the difficulty arising in the manufacturing of tires including such inserts. More particularly, tire molds are usually provided with radially extending ribs for forming the tire tread. In order for the wire insert to be most effective, it is necessary that it be centrally located within each section of the tire tread and, thus, centrally located between adjacent radial ribs of the tire mold. It has been suggested that the tire mold be provided with guide strips or other devices for centrally locating heretofore known wire inserts between the radial ribs of the mold. However, it is often relatively difficult to assemble the wire insert with such guide strips or other devices even when the insert is manufactured to close tolerances. Moreover, such guide strips or other devices unnecessarily add to the cost of the mold. A further and important disadvantage of guide strips or other devices on the mold for centering the wire insert is that they form grooves or ridges, or recesses, in the tire tread and certain manufacturers find this alteration of the tire tread undesirable.

A primary object of the present invention is to provide a novel wire insert for automobile tires which may be retained in the desired position in a tire mold without the aid of auxiliary positioning devices.

A further object of the present invention is to provide a novel wire insert for automobile tires as set forth in the preceding paragraph, which insert may be economically manufactured and is relatively effective for its intended purpose.

Still another object of the present invention is to provide a novel method of an apparatus for manufacturing wire inserts of the above described type.

A more specific object of the present invention is to provide a novel method of and apparatus for manufacturing the above described wire inserts in a continuous and economical manner.

Other objects and advantages of the present invention will become apparent in the following description and the accompanying drawings wherein:

Fig. 1 is a somewhat schematic side elevational view illustrating an apparatus embodying the features of this invention;

Fig. 2 is an enlarged fragmentary cross-sectional view taken along line 2—2 in Fig. 1 and showing a novel portion of the apparatus in greater detail;

Fig. 3 is an enlarged fragmentary cross-sectional view taken along line 3—3 in Fig. 2;

Fig. 4 is an enlarged fragmentary cross-sectional view taken along line 4—4 in Fig. 2;

Fig. 5 is an enlarged fragmentary cross-sectional view taken along line 5—5 in Fig. 2;

Fig. 6 is a somewhat schematic side elevational view of a portion of an apparatus embodying a modified form of the present invention;

Fig. 7 is an enlarged fragmentary cross-sectional view taken along line 7—7 in Fig. 6;

Fig. 8 is an enlarged fragmentary cross-sectional view taken along line 8—8 in Fig. 6;

Fig. 9 is an enlarged fragmentary cross-sectional view taken along line 9—9 in Fig. 6;

Fig. 10 is an enlarged fragmentary cross-sectional view taken along line 10—10 in Fig. 6;

Fig. 11 is a perspective view showing one of the wire forming elements of the apparattus of Fig. 6;

Fig. 12 is a fragmentary cross-sectional view illustrating how a wire insert embodying the principles of this invention may be assembled within a tire mold; and Fig. 13 is a perspective view illustrating a length of a wire insert constructed in accordance with the present invention.

Referring now more specifically to the drawings wherein like parts are designated by the same numerals throughout the various figures, a wire insert 20 embodying the principles of this invention, is shown best in Figs. 2, 12 and 13. The insert includes a length of wire stock which has been bent into a zig-zag shape. The zig-zag wire includes transverse sections 22 which are formed generally into U-shapes with ends 24 and 26 thereof turned inwardly, as shown best in Fig. 12. In addition, the bottom or closed end of each U-shape section is indented as indicated at 28. It has been found that by shaping the U-shaped sections in the manner just described, they will flex with the tire in a manner which will reduce sharp bending thereof. Thus, the transverse sections may have a relatively long useful life without breaking.

As will be understood, the connecting curved portions of the wire between adjacent transverse sections will be worn away after the tire has been in use for a relatively short period so that the U-shaped sections are separated from each other and the resulting free ends of the U-shaped sections provide toothlike elements for increasing the gripping power of the tire. After the U-shaped sections have been separated from each other, there is a tendency for them to turn out of the tire but it has been found that this tendency is effectively overcome by shaping the legs of the U-shaped sections and indenting the midportions of the sections in the manner illustrated.

In Fig. 12 there is illustrated a portion 30 of a conventional tire mold, which portion includes spaced apart radially extending ribs or flanges 32 and 34 for forming one annular section of the tire tread. In order for the wire insert to be most effective, the U-shaped sections should be spaced from the sides of the annular tread portion in which they are imbedded. This, of course, may be accomplished by spacing the U-shaped sections from the mold ribs 32 and 34 and preferably substantially centrally between the ribs. In accordance with the present invention, the wire insert may be properly positioned between the mold ribs without the aid of any auxiliary positioning device and without altering the standard mold shape. This novel result is accomplished by utilizing spaced portions of the wire insert for positioning the U-shaped sections between the ribs. More specifically, the wire insert is provided at spaced intervals with transverse sections 36 which are formed so that they extend laterally of the U-shaped sections to engage the mold ribs and properly position the insert. Preferably, the transverse sections are curved in the manner illustrated best in Fig. 12 so that they may be snapped into the space between the mold ribs for resiliently engaging the ribs and retaining the insert in place.

In Figs. 1 through 5, there is illustrated an apparatus 40 for making the wire insert 20. The apparatus 40 includes means 42 for forming straight wire stock into a zig-zag shape, and, if necessary, means 44 for compressing the zig-zag wire to decrease the angle between the transverse sections thereof. The details of the wire forming means 42 and 44 form no part of the present invention and, therefore, need not be specifically set forth. Thus, these wire forming means may be of any known construction and, in the particular illustrated apparatus, the means 42 includes a wheel structure 46 mounted on a shaft 48 and carries cooperating fingers, not shown, or other suitable means for bending the wire. In the particular embodiment illustrated, the compressing means 44 includes a pair of opposed rollers having helical grooves formed therein for receiving the ends of a zig-zag wire formed by the means 42. The lead of the helical grooves progressively decreases so that the zig-zag wire is compressed as it passes from the entering end of the grooves to the discharge end.

The apparatus 40 also includes means 50 for forming the flat zig-zag wire stock into a wire insert 20 and means 52 for feeding the wire stock into the forming means 50. The forming means 50 includes a novel die structure which is fully described below. The die structure is mounted on a punch press mechanism of any known construction having a reciprocating head 54. The feeding means 52 also may be of known construction and, therefore, need not be described in detail. It suffices to state that the feeding means 52 is operated in timed relationship with the reciprocating head 54 and this may be accomplished by means including a lever 56 secured to a rock shaft 58 of the feeding means and actuated by pin 60 carried by the reciprocating head 54.

The wire bending means 42 and 44 and the reciprocating head 54 are preferably continuously actuated in timed relationship whereby the wire insert may be continuously and rapidly formed. Any suitable drive mechanism may be provided for operating the various wire forming means in timed relationship and, in the illustrated structure, the drive mechanism includes a motor 62 which drives a conventional speed reducer 64. The speed reducer drives a shaft 66 through a belt or chain 68. The shaft 66 drives the wire forming means 42 through belt or chain means 70 and 72 and an intermediate shaft 74. The wire forming means 44 is driven from the shaft 66 through belt or chain means 76, an intermediate shaft 78 and gear means 80. The shaft 66 may also be utilized to operate the punch press by driving a shaft 82 through belt or chain means 84. The shaft 82 is, of course, connected with the usual punch press actuating mechanism, not shown.

The novel die structure of the wire forming means 50 is illustrated best in Figs. 2 through 5. This die structure includes a first set of upper and lower dies 86 and 88 having the shape shown best in Fig. 3. This set of dies receives the flat zig-zag wire stock from guide means 90 of the feed mechanism 52 and forms the ends of the transverse wire sections out of the plane of the zig-zag wire stock. This initial bending of the transverse wire sections reduces any possibility of injuring the wire when it is bent to the final desired shape. In addition to the bending of the ends of the transverse wire sections, the dies 86 and 88 are preferably provided with cooperating portions 92 and 94 for indenting mid portions of the wire sections.

The die structure also includes a second set of upper and lower dies 96 and 98. As shown best in Fig. 4, the die 96 is provided with a generally U-shaped wire forming surface 100 at its entering end. In addition, the die 98 is undercut as at 102 and 104 so that when the dies are moved together, as shown in Fig. 4, the transverse wire sections are formed generally into U-shapes with the legs which have been previously bent by the die 86 turned slightly inwardly.

It is an important feature of the present invention that the die 96 is formed to provide the wire insert with the above described laterally extending transverse sections 36. Thus, in the embodiment illustrated, the die 96 is provided adjacent its discharge end with a wire forming surface 106, as shown best in Fig. 5. The surface 106 may be varied in shape in accordance with the requirements of the particular insert to be formed or, in other words, in accordance with the distance it is desired that the transverse sections 36 extend laterally of the U-shaped transverse sections 22. Moreover, in some cases, the forming surface 106 might be eliminated altogether and the die block shortened so that the transverse wire sections 36 would be left with the shape provided them by the die 86. In this last mentioned modification, it is understood that the feeding means 52 should be adjusted to feed a length of wire stock substantially equal to the length of the die 86 and longer than the length of the shorter die 96. When the forming surface 106 is provided, the dies 86 and 96 may be of the same length and the stroke of the feeding means will be equal to this length.

In order to prevent injury to the wire as it enters between the dies 86 and 88, and again as it enters between the dies 96 and 98, the dies are formed so that only about one-half of a zig-zag portion of the wire disposed at the entering ends of the dies is formed. This is accomplished by providing the dies 86 and 88 with beveled entering ends 108 and by providing the dies 96 and 98 with similar beveled entering ends 110, as shown in Fig. 2. Preferably, the angle of the beveled ends of the dies is about equal to the angle of the transverse wire sections to the axis of the wire stock so that the dies may strike the transverse wire sections at the entering ends thereof substantially in the middle. It is, of course, understood that the feeding means 52 may be adjusted to locate the transverse wire sections properly with respect to the entering ends of the dies.

In Figs. 6 through 11, there is illustrated a modified form of the apparatus of this invention which is adapted to bend continuously moving zig-zag wire stock into a wire insert 20. This embodiment of the apparatus may include means similar to the wire forming means 42 and 44, described above, for bending straight wire stock into a zig-zag shape. In accordance with this modification, the zig-zag wire stock is directed from the bending means 44 to means 112 for partially bending the transverse wire sections, means 114 for bending the transverse wire sections generally into U-shapes and means 116 for bending the ends of the U-shaped wire sections slightly inwardly.

As shown best in Figs. 6, 7 and 8, the means 112 may include a pair of rollers 118 and 120 having helical grooves 122 and 124 therein for receiving the ends of the transverse wire sections. Upper and lower rollers 126 and 128 and upper and lower guide blocks 130 and 132 are provided for retaining the zig-zag wire between the rollers 118 and 120. The rollers 118 and 120 are formed and positioned so that the bottoms of the grooves 122 and 124 converge toward each other in order to bend the transverse wire sections in the manner shown best in Fig. 8. In the illustrated embodiment this is accomplished by varying the depth of the helical grooves, but it is understood that the same result might be accomplished by forming the helical grooves uniformly throughout their lengths, and positioning the rollers 118 and 120 at an angle to each other.

The wire forming means 114 includes upper and lower rollers 134 and 136 which are adapted to grip and feed the wire therebetween. In addition, rollers 138 and 140 are disposed at opposite sides of the rollers 134 and 136, in the manner shown best in Fig. 9, for engaging opposite ends of the partially formed transverse wire sections and forming the wire sections generally into U-shapes. In accordance with the present invention, the rollers 138 and 140 are respectively provided with peripheral recesses 142 and 144, which recesses are adapted to receive the ends of a transverse wire section. The wire section received within the roller recesses will not be bent into a U-shape so that such wire section provides the laterally extending section 36 of the insert 20. As will be understood, the roller recesses will receive one transverse wire section for each revolution so that the insert 20 will be provided with a plurality of spaced sections 36. If desired, the roller recesses may be provided with a wire forming bottom surface, not shown, for bending wire sections received therein to any desired position wherein such wire sections still extend laterally of the U-shaped sections.

The final wire bending means 116 also includes a pair of rollers 146 and 148 for gripping and feeding the wire therebetween. In addition, these rollers are respectively provided with a peripheral groove 150 and a peripheral rib 152 for indenting mid portions of the transverse wire sections. Rollers 154 and 156 are provided for bending the ends of the previously formed substantially U-shaped sections slightly inwardly in the manner indicated. The rollers 154 and 156 are also provided with peripheral recesses 158 and 160, similar to the above described recesses 142 and 144 for receiving the laterally extending transverse wire sections. While the mechanism for driving the various rollers of the wire forming means 112 to 116 has not been illustrated, it is understood that any suitable mechanism including gears, drive belts or chains of known construction may be provided for continuously driving the rollers in timed relationship with each other.

From the above description, it is seen that the present invention has provided a novel wire insert for automobile tires which is of simple and economical construction and which may be readily assembly within a standard tire mold without the aid of auxiliary retaining or positioning means. When positioning the insert 20 within a mold, the insert is of course first cut to proper length from the continuous insert stock formed by the method and apparatus described above. It should be understood that the inserts may be cut to any desired length at any convenient time after the wire leaves the apparatus described above. In any event, the insert is preferably cut to a length which is slightly greater than the peripheral dimension of the mold so that by compressing the insert lengthwise, it may be inserted within the mold and the inherent resiliency of the wire will force the insert against the outer surface of the mold.

From the above description, it is also seen that the present invention has provided a novel method and apparatus whereby the insert 20 may be rapidly and economically formed from continuous straight wire stock. More specifically, it is seen that by the method and apparatus of the present invention, the wire stock may be continuously formed into a plane zig-zag shape and the resulting zig-zag wire may then be either intermittently or continuously formed so that the transverse sections of spaced portions thereof are bent substantially into U-shapes and other spaced transverse sections are bent so that they extend laterally of the U-shaped sections.

While the preferred embodiments of the present invention have been shown and described herein, it is obvious that many details may be changed without departing from the spirit and scope of the appended claim.

The invention is claimed as follows:

A tire wire insert adapted to be embedded in the tread ribs of a vehicle tire and exposed at the tread surface, and comprising a length of generally zig-zag wire bent along the longitudinal axis of the length of wire to form U-shaped portions disposed transversely of the length of wire with the legs of adjacent U-shaped portions joined to provide closed ends spaced along each opposite side of the longitudinal axis of the length of wire, oppositely disposed legs at spaced intervals between groups of U-shaped portions being disposed transversely outwardly of the legs in said groups to frictionally engage the sides of the ribs of a tire mold and position the insert therein, with the closed ends of the said groups of U-shaped portions disposed symmetrically along the central portion of the tread rib and at the outer surface thereof to wear away with wear of the tread surface and present toothlike elements along the tread surface for increased gripping power.

References Cited in the file of this patent
UNITED STATES PATENTS

| | | |
|---|---|---|
| 2,129,605 | Catini | Sept. 6, 1938 |
| 2,130,318 | Cruzan | Sept. 13, 1938 |
| 2,190,722 | Martin | Feb. 20, 1940 |
| 2,600,506 | Kimes | June 17, 1952 |
| 2,666,470 | Kimes | Jan. 19, 1954 |
| 2,670,024 | Antonson | Feb. 23, 1954 |